United States Patent

Furukawa et al.

(10) Patent No.: US 6,806,217 B2
(45) Date of Patent: Oct. 19, 2004

(54) GLASS FOR MOLDED LENS

(75) Inventors: Shigeo Furukawa, Moriguchi (JP); Masahiro Hiraka, Ikoma (JP); Shigeki Yamada, Kyoto (JP); Yoshiki Higashiyama, Nara (JP)

(73) Assignee: Matsushita Electric Industrial Co., Ltd. (JP)

( * ) Notice: Subject to any disclaimer, the term of this patent is extended or adjusted under 35 U.S.C. 154(b) by 29 days.

(21) Appl. No.: 10/363,831

(22) PCT Filed: Dec. 20, 2001

(86) PCT No.: PCT/JP01/11178

§ 371 (c)(1),
(2), (4) Date: Mar. 7, 2003

(87) PCT Pub. No.: WO02/053506

PCT Pub. Date: Jul. 11, 2002

(65) Prior Publication Data

US 2003/0158027 A1 Aug. 21, 2003

(30) Foreign Application Priority Data

Dec. 28, 2000 (JP) ........................ 2000-400446

(51) Int. Cl.$^7$ .................... C03C 3/068; C03C 3/066
(52) U.S. Cl. .................................. 501/78; 501/79
(58) Field of Search ................ 501/49–52, 64, 501/65, 72, 73, 77–79

(56) References Cited

U.S. PATENT DOCUMENTS

| 3,958,999 | A | * | 5/1976 | Izumitani et al. | ............... 501/51 |
| 4,469,800 | A | * | 9/1984 | Boudot et al. | ................. 501/43 |
| 4,612,295 | A | * | 9/1986 | Sagara | ......................... 501/51 |
| 4,642,297 | A | * | 2/1987 | Mennemann et al. | ......... 501/78 |
| 6,251,813 | B1 | * | 6/2001 | Sato | ............................. 501/78 |

FOREIGN PATENT DOCUMENTS

| DE | 19919304 A1 | * | 11/1999 | ........... C03C/3/068 |
| JP | 60221338 A | * | 11/1985 | ........... C03C/3/068 |
| JP | 62100449 A | * | 5/1987 | ........... C03C/3/064 |
| JP | 03093645 A | * | 4/1991 | ............. C03C/4/00 |
| JP | 03093648 A | * | 4/1991 | ............. C03C/4/00 |
| JP | 8-59282 | | 3/1996 | |
| JP | 2001-72432 | | 3/2001 | |
| JP | 2001220170 A | * | 8/2001 | ........... C03C/3/068 |
| WO | WO 00/21895 | | 4/2000 | |

OTHER PUBLICATIONS

Derwent Abstract 2000–014710 of DE 199 19 304 and US 6,251,813.*
Derwent Abstract 2002–043961 of JP 2001–220170 A.*
Machine Translation of JP 2001–220170 A.*
Derwent Abstract 1991–159266 of JP 03–93645 A.*
Derwent Abstract 1987–167506 of JP 62–100449 A.*
Derwent Abstract 1991–159269 of JP 03–093648 A.*

* cited by examiner

Primary Examiner—Karl Group
Assistant Examiner—Elizabeth A. Bolden
(74) Attorney, Agent, or Firm—Parkhurst & Wendel, L.L.P.

(57) ABSTRACT

A mold lens glass including $B_2O_3$, $SiO_2$, $La_2O_3$, ZnO, BaO, and CaO, wherein the components in the composition are present in a weight ratio: of $B_2O_3$ (25% to 35% by weight), $SiO_2$ (1% to 7% by weight), wherein the total amount of $B_2O_3$ and $SiO_2$ is 30% to 40% by weight. $La_2O_3$ is present in an amount of 12% to 20% by weight, and the total amount of ZnO, BaO and CaO is 40% to 55% by weight. By using the mold lens glass of the present invention, it is possible to obtain a mold lens glass having a high refractive index, excellent water resistance, and a stable glassy state.

1 Claim, No Drawings

GLASS FOR MOLDED LENS

The present invention relates to a glass composition for a lens that can be molded by hot pressing of a glass preform between metal molds with curved lens surfaces, particularly to glass for mold lens having a high refractive index and low dispersion.

BACKGROUND OF THE INVENTION

Conventionally, a composition of optical glass has been formulated to give necessary characteristics such as refractive index, Abbe's number, and chemical durability, without taking into account lowering of the glass transition temperature (Tg) of the optical glass.

Hot press molding technologies for a mold lens were developed since around 1983. Hot press molding requires no polishing and is capable of accurate control of a surface shape and surface roughness equivalent to those of a polished surface.

Glass for such mold lens is used at present for a pickup lens of an optical disk apparatus.

A mold lens can be obtained by pressing for a long time (about 20 sec.) at a temperature 10 to 20° C. higher than a flexure temperature of glass, using accurately ground and polished metal molds.

The metal mold surface is coated with a thin film of diamond-like carbon (DLC) or TiCN in order to release the mold lens from the metal molds.

The glass used for mold lens glass is required to be low in Tg for prolonging the life of the mold coating and reducing the production cost, while it is desirable for the glass to be high in refractive index to reduce aberration of lens such as spherical aberration. That is, mold lens glass is required to be low in Tg and high in refractive index ($n_d$).

Further, in a case of glass that is easily crystallized, it is difficult to reliably produce an excellent lens, and therefore, a glass composition that hardly crystallizes is required.

Also, in a case of glass having poor water resistance, a surface of the glass reacts with moisture in the air, causing whitening of the glass surface, and therefore, the water resistance of glass has to be sufficiently high.

The present invention is intended to provide mold lens glass having excellent water resistance, low Tg and high refractive index ($n_d$) and is hard to crystallize during a process of producing the glass.

SUMMARY OF THE INVENTION

The mold lens glass of the present invention includes $B_2O_3$, $SiO_2$, $La_2O_3$, ZnO, BaO, and CaO. A glass composition includes 25% to 35% by weight of $B_2O_2$ and 1% to 7% by weight of $SiO_2$. The composition includes 30% to 40% total weight of $B_2O_3$ and $SiO_2$, 12% to 20% by weight of $La_2O_3$, and 40% to 55% by total weight of ZnO, BaO and CaO.

DETAILED DESCRIPTION OF THE INVENTION

The mold lens glass (hereinafter referred to as "glass") in a preferred first and second embodiment of the present invention is described herein.

First preferred Embodiment

Guaranteed grade reagents (JIS) of $H_3BO_3$, $SiO_2$, $La_2O_3$, ZnO, BaO and CaO were mixed to form a composition within the ranges of the present invention, and then the mixture was melted at 1350° C. for 20 minutes.

Next, the molten glass was poured onto metal molds previously heated up to glass transition temperature Tg and the molten glass is vitrified.

Subsequently, the glass was cooled in an annealing furnace, at a cooling speed of 10° C./h from Tg to Tg40° C. and, then, at 100° C./h to eliminate heat stress.

Next, the glass was formed into a rectangular parallel piped shape of 15 mm×15 mm×5 mm, and every surface are polished, followed by a measurement of both refractive index and Abbe's number.

Further, a part of the glass is crushed into powder, and differential thermal analysis (DTA) was performed to obtain Tg, Ts, and liquid-phase temperature ($T_L$) values.

The vitrification ranges of glass thus obtained will be explained with reference to Table 1 below.

Glass compositions based on ($SiO_2$, $B_2O_3$)—$La_2O_3$—(BaO, ZnO, CaO) and their characteristics are shown in Table 1.

Here, β values are calculated as parameters that show the stability of glass, that is, the extent of being hard to crystallize. The β values are calculated by the following equation, and the larger the value, the higher the stability of the glass.

$$\beta = (T_c - Tg)/(T_L - T_c)$$

where Tg is the glass transition temperature, $T_c$ is the crystallization temperature, and $T_L$ is liquid-phase temperature.

The refractive index, Abbe's number and characteristic temperature of each glass was measured also.

Abbe's number vd is calculated by the following equation, and the larger the Abbe's number, the less the dispersion of the glass.

$$vd = (n_d - 1)/(n_F - n_c)$$

where $n_F$ is refractive index at F line (wavelength 486.1 nm), $n_c$ is refractive index at C line (wavelength 656.3 nm), and $n_d$ is refractive index at d line (wavelength 587.6 nm).

Table 1 shows that the glass is unstable because the β value is as small as not more than 2 when the total amount of $B_2O_3$ and $SiO_2$, which is a glass forming oxide, is about 25% by weight. Also, it is shown that the Tg is very high when the total amount of $B_2O_3$ and $SiO_2$ exceeds 40% by weight, and the composition thus is not suitable for mold lens glass.

Further, it was found that the stability of glass can be improved by mixing and substituting divalent metal oxide component (BaO) with other components (ZnO, CaO).

TABLE 1

| No. | $B_2O_3$ | $SiO_2$ | $La_2O_3$ | BaO | ZnO | CaO | Tg (° C.) | $T_c$ (° C.) | $T_L$ (° C.) | β | $n_d$ |
|---|---|---|---|---|---|---|---|---|---|---|---|
| 1 | 30 | — | 15 | 55 | — | — | 550 | 614 | 1029 | 0.154 | — |
| 2 | 30 | — | 20 | 50 | — | — | 565 | 643 | 1023 | 0.205 | — |

TABLE 1-continued

| No. | $B_2O_3$ | $SiO_2$ | $La_2O_3$ | BaO | ZnO | CaO | Tg (°C.) | $T_c$ (°C.) | $T_L$ (°C.) | β | $n_d$ |
|---|---|---|---|---|---|---|---|---|---|---|---|
| 3 | 30 | — | 25 | 45 | — | — | 570 | 669 | 1023 | 0.280 | — |
| 4 | 35 | — | 10 | 55 | — | — | 568 | 644 | 981 | 0.226 | — |
| 5 | 35 | — | 15 | 50 | — | — | 577 | 670 | 979 | 0.301 | 1.671 |
| 6 | 35 | — | 20 | 45 | — | — | 574 | 700 | 958 | 0.488 | 1.678 |
| 7 | 35 | — | 25 | 40 | — | — | 593 | 747 | 941 | 0.794 | 1.686 |
| 8 | 40 | — | 10 | 50 | — | — | 593 | 792 | 909 | 1.701 | 1.651 |
| 9 | 40 | — | 20 | 40 | — | — | 599 | 737 | 873 | 1.015 | 1.673 |
| 10 | 40 | — | 30 | 30 | — | — | 613 | 751 | 913 | 0.852 | 1.684 |
| 11 | 50 | — | 10 | 40 | — | — | 600 | 820 | 923 | 2.136 | 1.627 |
| 12 | 50 | — | 40 | 10 | — | — | 644 | 770 | 980 | 0.600 | — |
| 13 | 55 | — | 10 | 35 | 50 | — | 599 | 802 | 960 | 1.285 | 1.609 |
| 14 | 35 | — | 15 | — | 50 | — | 542 | 696 | 948 | 0.611 | 1.693 |
| 15 | 35 | — | 15 | — | — | 50 | Crystalized | — | — | — | — |
| 16 | 35 | — | 15 | 40 | 10 | — | 560 | 796 | 852 | 4.214 | 1.680 |
| 17 | 35 | — | 15 | 30 | 20 | — | 547 | 740 | 803 | 3.063 | 1.685 |
| 18 | 35 | — | 15 | 20 | 30 | — | 541 | 798 | 837 | 6.590 | 1.689 |
| 19 | 35 | — | 15 | 10 | 40 | — | 534 | 693 | 867 | 0.914 | 1.692 |
| 20 | 30 | — | 20 | — | 50 | — | 536 | 648 | 822 | 0.644 | 1.717 |
| 21 | 30 | — | 25 | — | 45 | — | 534 | 664 | 861 | 0.660 | 1.725 |
| 22 | 25 | 10 | 15 | 20 | 30 | — | 554 | 711 | 823 | 1.402 | 1.689 |
| 23 | 20 | 15 | 15 | 20 | 30 | — | 558 | 836 | 940 | 2.673 | 1.689 |
| 24 | 30 | 5 | 15 | 20 | 20 | 10 | 552 | 810 | 906 | 2.688 | 1.689 |
| 25 | 25 | 10 | 15 | 20 | 20 | 10 | 557 | 805 | 889 | 2.952 | 1.689 |
| 26 | 20 | 15 | 15 | 20 | 20 | 10 | 556 | 732 | 819 | 2.023 | 1.689 |
| 27 | 21 | 15 | 15 | 20 | 20 | 10 | 570 | 740 | 793 | 3.208 | 1.687 |
| 28 | 15 | 10 | 15 | 24 | 24 | 12 | 532 | 772 | 1027 | 0.941 | — |
| 29 | 20 | 5 | 15 | 24 | 24 | 12 | 527 | 760 | 1012 | 0.925 | — |
| 30 | 15 | 15 | 15 | 22 | 22 | 11 | 540 | 812 | 921 | 2.495 | 1.692 |
| 31 | 20 | 10 | 15 | 22 | 22 | 11 | 532 | 803 | 916 | 2.398 | 1.701 |
| 32 | 25 | 5 | 15 | 22 | 22 | 11 | 528 | 795 | 910 | 2.322 | 1.713 |
| 33 | 25 | 15 | 15 | 18 | 18 | 9 | 623 | 853 | 928 | 3.067 | 1.678 |
| 34 | 30 | 10 | 15 | 18 | 18 | 9 | 614 | 827 | 901 | 2.878 | 1.686 |
| 35 | 35 | 5 | 15 | 18 | 18 | 9 | 601 | 802 | 876 | 2.716 | 1.691 |

(Composition: % by weight)

Second Preferred Embodiment

The second preferred embodiment of the present invention will be described herein.

Glass is manufactured with the ratios of BaO, ZnO, and CaO varied where the glass compositions are set as $B_2O_3$ [=] being from 30% to 31% by weight, $SiO_2$ [=] being 5% by weight, and $La_2O_3$ [=]15% by weight.

The water resistance of glass obtained was measured by the following method. That is, glass powder equivalent to specific gravity (constant volume) and having particle diameter of from 250 μm to 420 μm was boiled for one hour in boiling water, followed by a measurement of the decrease in weight (Dw) of the glass. The results are shown in Table 2.

TABLE 2

| No. | $B_2O_3$ | $SiO_2$ | $La_2O_3$ | BaO | ZnO | CaO | $n_d$ | Dw (%) |
|---|---|---|---|---|---|---|---|---|
| 1 | 30 | 5 | 15 | 20 | 20 | 10 | 1.689 | 0.532 |
| 2 | 30 | 5 | 18 | 18.8 | 18.8 | 9.4 | 1.696 | 0.316 |
| 3 | 30 | 5 | 17 | 19.2 | 19.2 | 9.6 | 1.701 | 0.439 |
| 4 | 32 | 5 | 15 | 19.2 | 19.2 | 9.6 | 1.695 | 0.361 |
| 5 | 31 | 5 | 17 | 18.8 | 18.8 | 9.4 | 1.691 | 0.478 |
| 6 | 31 | 5 | 15 | 14.7 | 29.4 | 4.9 | 1.689 | 0.038 |
| 7 | 31 | 5 | 15 | 9.8 | 29.4 | 9.8 | 1.687 | 0.014 |
| 8 | 31 | 5 | 15 | 4.9 | 34.3 | 9.8 | 1.691 | 0.055 |

(Composition: % by weight)

As shown in Table 2, it is clear that the water resistance of the glass can be improved by optimizing the component ratio of divalent metal oxide.

INDUSTRIAL APPLICABILITY

As is apparent in the preferred embodiments of the present invention, the present invention is able to provide mold lens glass which has a low Tg, a high refractive index ($n_d$), is hard to crystallize during the production process, and has excellent water resistance.

What is claimed is:
1. A mold lens glass consisting of
   25% to 35% by weight of $B_2O_3$ and
   1% to 7% by weight of $SiO_2$, the total amount of $B_2O_3$ and $SiO_2$ being 30% to 40% by weight; and
   12% to 20% by weight of $La_2O_3$, 25% to 35% by weight of ZnO, 5% to 16% by weight of BaO, and 4% to 11% by weight of CaO, the total amount of ZnO, BaO, and CaO being 40% to 55% by weight.

* * * * *